United States Patent [19]
Sato

[11] Patent Number: 5,303,015
[45] Date of Patent: Apr. 12, 1994

[54] RECORDING APPARATUS FOR CONSERVING ENERGY

[75] Inventor: Kaoru Sato, Yokohama, Japan

[73] Assignee: Canon Kabushiki Kaisha, Tokyo, Japan

[21] Appl. No.: 883,163

[22] Filed: May 15, 1992

Related U.S. Application Data

[63] Continuation of Ser. No. 449,757, Dec. 13, 1989, abandoned.

[30] Foreign Application Priority Data

Dec. 15, 1988 [JP] Japan .................. 63-317249

[51] Int. Cl.⁵ .................................. G03G 15/20
[52] U.S. Cl. ................................. 355/285; 219/216; 355/203; 355/208; 355/289; 355/290; 430/124
[58] Field of Search ............. 355/285, 282, 289, 290, 355/295, 203, 204, 208; 219/216; 430/98, 124

[56] References Cited

U.S. PATENT DOCUMENTS

| | | | |
|---|---|---|---|
| 3,948,215 | 4/1976 | Namiki | 118/60 |
| 4,954,845 | 9/1990 | Yano et al. | 355/290 |
| 5,081,493 | 1/1992 | Miyasaka | 355/208 |
| 5,115,278 | 5/1992 | Maruta et al. | 355/285 |
| 5,115,279 | 5/1992 | Nishikawa et al. | 355/290 |
| 5,149,941 | 9/1992 | Hirabayashi et al. | |

FOREIGN PATENT DOCUMENTS

| | | | |
|---|---|---|---|
| 0076041 | 6/1978 | Japan | 355/285 |
| 57-23984 | 2/1982 | Japan | |
| 57-73773 | 5/1982 | Japan | |
| 0194052 | 11/1983 | Japan | 355/208 |
| 60-69672 | 4/1985 | Japan | |
| 61-029261 | 2/1986 | Japan | |
| 0187582 | 7/1989 | Japan | 355/289 |

OTHER PUBLICATIONS

Xerox Disclosure Journal, "Process Control of Machine copy Rate to Enable Optimum Energy Efficient Productivity", vol. 8, No. 2, Mar./Apr. 1983.

Primary Examiner—Matthew S. Smith
Attorney, Agent, or Firm—Fitzpatrick, Cella, Harper & Scinto

[57] ABSTRACT

A recording apparatus has an image forming unit for forming a visible image on a recording medium in accordance with an inputted image signal, a fixing unit for fixing the visible image on the recording medium with a heating element which is heated upon conduction of electric power, and a control unit for controlling the conduction of electric power to the heating element in accordance with the inputted image signal.

19 Claims, 9 Drawing Sheets

RECORDING APPARATUS FOR CONSERVING ENERGY

This application is a continuation of application Ser. No. 07/449,757, filed Dec. 13, 1989, now abandoned.

BACKGROUND OF THE INVENTION

The present invention relates to a recording apparatus of the type that a visible image is first formed with image visualizing substance on a recording sheet and then heated to be fixed thereon.

A fixing unit for use with the recording apparatus of this type generally employs a roller fixing method whereby a transfer sheet formed thereon an unfixed toner image is heated during the transportation by being squeezed between a heating roller maintained at a predetermined temperature and a pressure roller having an elastic layer thereon for pressing the heating roller. The heating roller, however, is required to be maintained at an optimum temperature so as to avoid a so-called offset phenomenon that toner is transferred onto the heating roller, necessitating a large heat capacity of the heating roller or its heating element. It has therefore been necessary to set the heating roller at an optimum temperature by supplying electric power to the heating element for a predetermined period in advance of using it.

The print speed of recent recording apparatus such as a printer has become high. In order to cope with such high print speed, the heat capacity of the heating roller or its heating element has been determined in such a manner that electric power is supplied to the heating element at the same time upon reception of a record start instruction to thereby obtain an optimum fixing temperature when a transfer sheet reaches the fixing unit.

With such temperature control, electric power is supplied to the heating element irrespective of whether or not a toner image has been transferred to a transfer sheet. For example, even in the case where a controller unit outputs a "new page" code to feed a blank transfer sheet without any toner, electric power is supplied for the setting of the optimum fixing temperature, thereby consuming wasteful electric power.

SUMMARY OF THE INVENTION

The present invention has been made in consideration of the above problems and has as its object to provide an improved recording apparatus.

It is another object of the present invention to provide a recording apparatus capable of avoiding wasteful power consumption.

It is a further object of the present invention to provide a recording apparatus capable of heating and fixing image visualizing substance while using a heating element having a small heat capacity.

It is a still further object of the present invention to provide a recording apparatus capable of preventing the apparatus temperature from being raised too much.

It is another object of the present invention to provide a recording apparatus which intercepts the heating of the heating element when no image signal is supplied.

The above and other objects of the present invention will become apparent from the following detailed description and the accompanying drawings.

DESCRIPTION OF THE PREFERRED EMBODIMENTS

Figure 1:
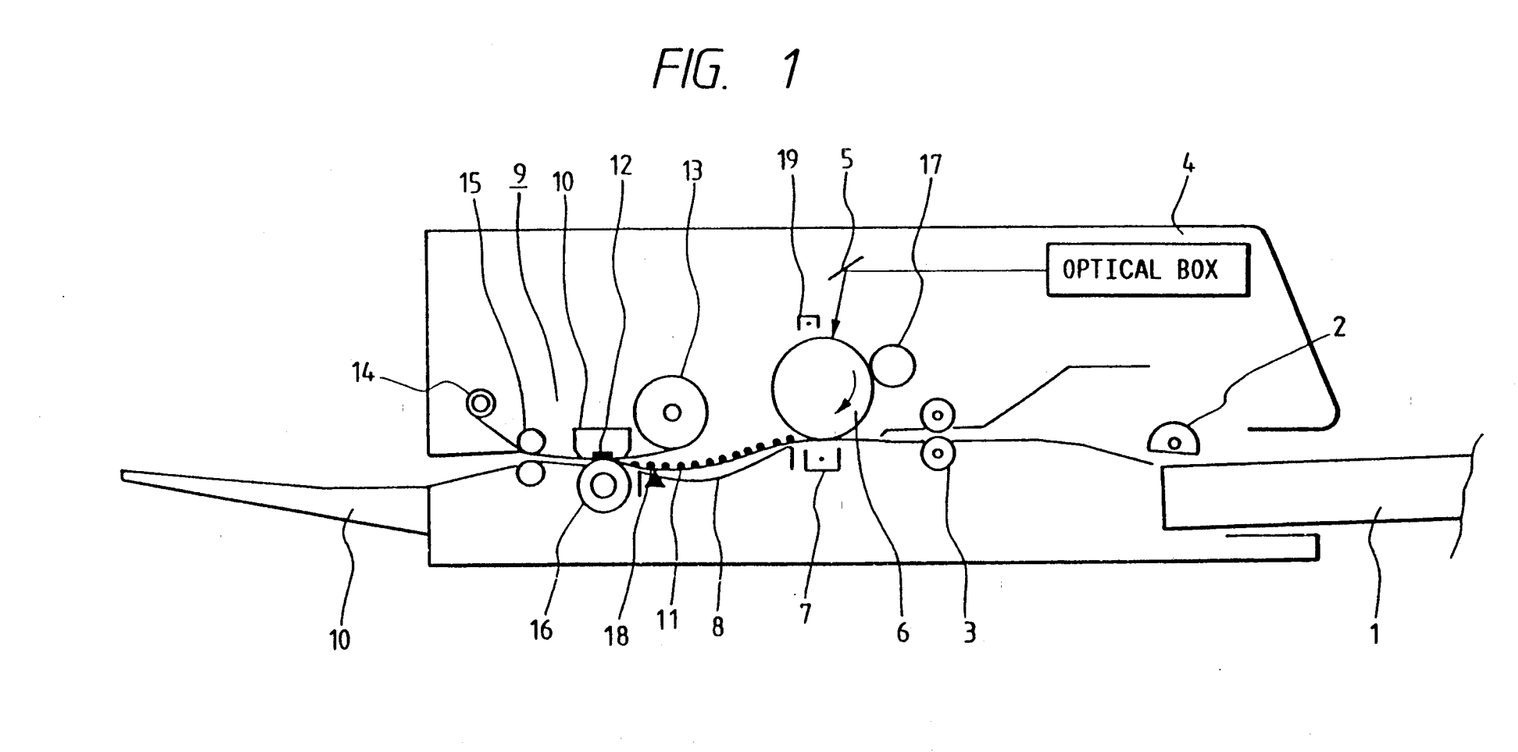
FIG. 1 is a schematic diagram showing the structure of a recording apparatus according to an embodiment of this invention.
Figure 2:
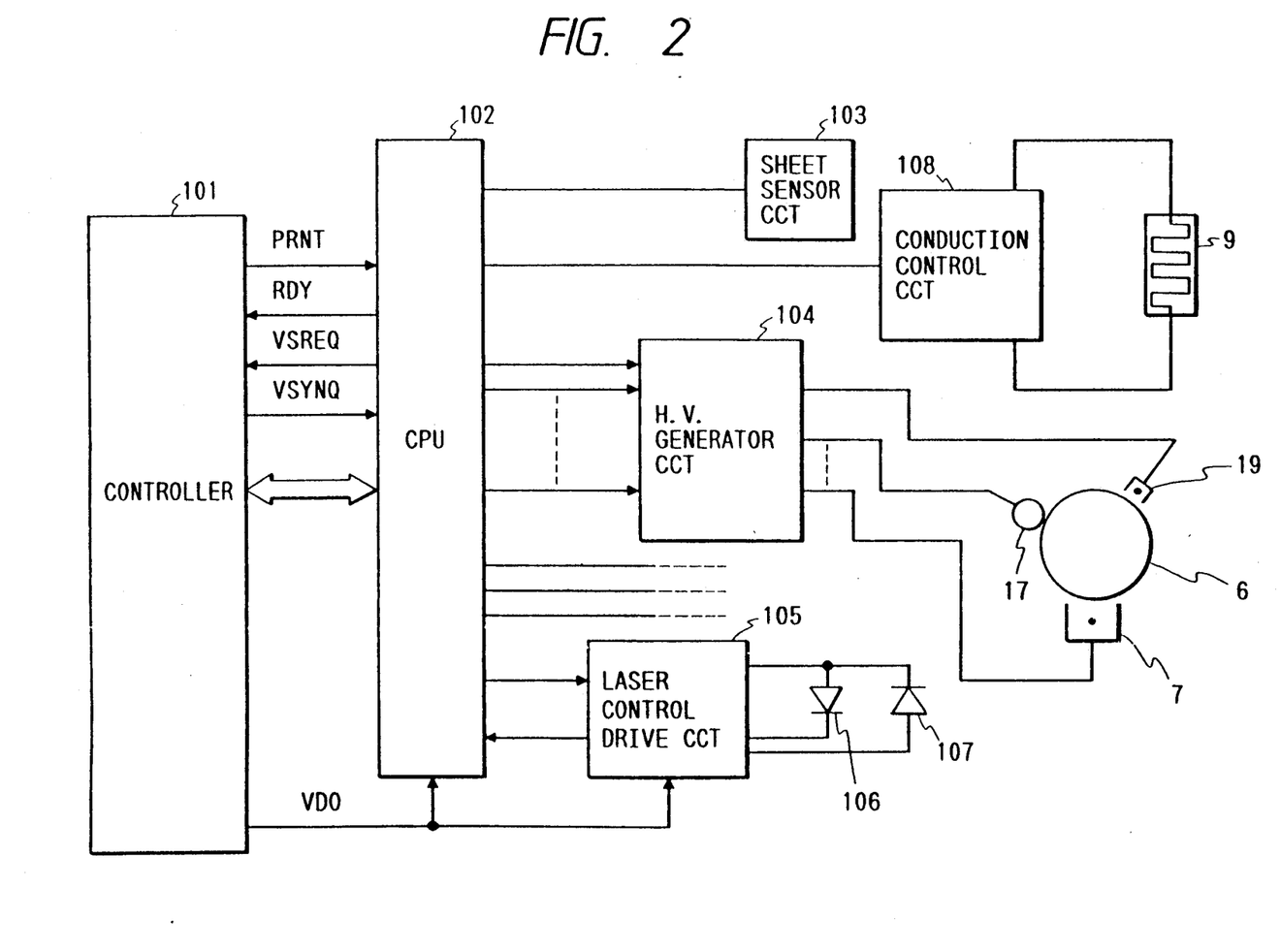
FIG. 2 is a block diagram showing the controller unit of the recording apparatus shown in FIG. 1.

FIGS. 1 and 2 show the outline of the structure of a laser beam printer and the controller unit thereof, according to an embodiment of this invention.

Referring first to FIG. 1, a paper cassette 1 stacks therein transfer sheets. A paper feed roller 2 feeds a transfer sheet out of the paper cassette 1. A paper position alignment roller (hereinafter abbreviated as registration roller) 3 makes a transfer sheet in registration with a visible image on a photosensitive drum 6. An optical box 4 has therein a polygon mirror, laser and the like. A laser reflection mirror 5 guides a laser beam onto the photosensitive drum 6. A transfer charger 7 is used for the transfer of a visible image on the photosensitive drum 6 onto a transfer sheet. Reference number 8 designates a transport guide, 9 a fixing unit for fixing a visible image transferred on a transfer sheet, and 10 a heating element of the fixing unit 9. The heating element 10 is heated through electric power of pulse form. The heating element 10 fixed to the apparatus is made of a wire and has a low heat capacity. Reference number 12 designates a heating surface of the heating element 10. Reference number 11 designates a transfer sheet, and 13 a heat-resistive sheet which moves at the same speed as a transfer sheet. A transfer sheet is heated via the heat-resistive sheet 13 with the heating element 10 for the heating and fixing of a toner image. Reference number 14 designates a takeup roller for the takeup of a heat-resistive sheet, 15 a separation roller for the separation between a heat-resistive sheet and a transfer sheet, and 16 a pressure roller which exerts a pressure against the heating element 10 fixedly mounted to the apparatus so that a transfer sheet is made in close contact with the heating element, with the heat-resistive sheet 13 interposed therebetween. Reference number 17 designates a development sleeve for visualizing an electrostatic latent image on the photosensitive drum 6 by using toner, 10 a paper discharge tray, 18 a paper sensor mounted in front of the fixing unit 9 for the detection of a transfer sheet, and 19 a primary charger for uniformly charging the photosensitive drum.

Referring then to the block diagram of FIG. 2 showing the controller unit of the laser beam printer of FIG. 1, reference number 101 designates a controller which sends image signals to the printer, 102 a one-chip microcomputer (hereinafter called CPU) which controls the printer engine and includes therein a ROM and RAM, 103 a paper sensor circuit which includes a paper sensor 18, 104 a high voltage generator circuit which supplies a high voltage to the primary charger 19, transfer charger 7, and development sleeve 17, 105 a laser control drive circuit, 106 a laser diode, 107 a pin photodiode, and 108 a conduction control circuit for controlling the supply of electric power to the heating element 10.

CPU 102 outputs a print ready signal (hereinafter abbreviated as RDY signal) to the controller 101 if the printer is in a print ready state. The controller 101 outputs a print signal (hereinafter abbreviated as PRNT signal) to the printer. Upon reception of this PRNT signal, CPU 102 causes the rotation of the paper feed roller 2 at a predetermined timing for the transportation of a transfer sheet to the registration roller 3. CPU 102 then performs a light quantity adjustment of the semiconductor laser 106 and other operations, and outputs a vertical synchro request signal (hereinafter abbreviated as VSREQ signal) to the controller 101 during the print ready state. Upon reception of the VSREQ signal, the controller 101 sends a vertical synchro signal (hereinafter abbreviated as VSYNC signal) and thereafter sends image or video signals (hereinafter abbreviated as VDO signal) at a predetermined timing. Upon reception of this VSYNC signal, CPU 102 causes the rotation of the registration roller 3 at a predetermined timing to transport a transfer sheet. The VDO signal is supplied to CPU 102, and to the laser drive circuit 105 for turning on and off the laser diode 106. A laser beam radiated from the laser diode 106 is reflected by the polygon mirror under rotation and by the reflection mirror 5 to thereby form an electrostatic latent image on the photosensitive drum 6. The latent image on the photosensitive drum 6 is attached with toner at the portions the laser beam was applied, and developed, by means of a development high voltage generated by the high voltage generator circuit 104 and by means of the development sleeve 17. The registration roller 3 is further rotated to transport the transfer sheet so that the developed toner on the photosensitive drum 6 is transferred onto the transfer sheet. The transfer sheet with toner is conveyed further along the transport guide 8. Upon detection of this transfer sheet by the paper feed sensor 18, electric power is supplied to the heating element 10 mounted on the fixing unit 9 for the heating and fixing thereof by means of the heating surface of the fixing unit 9 and the pressure roller 16. Then the transfer sheet and the heat-resistive sheet 13 are separated by the separation roller 15, the transfer sheet thereby being discharged onto the paper discharge tray 10.

Figure 3:
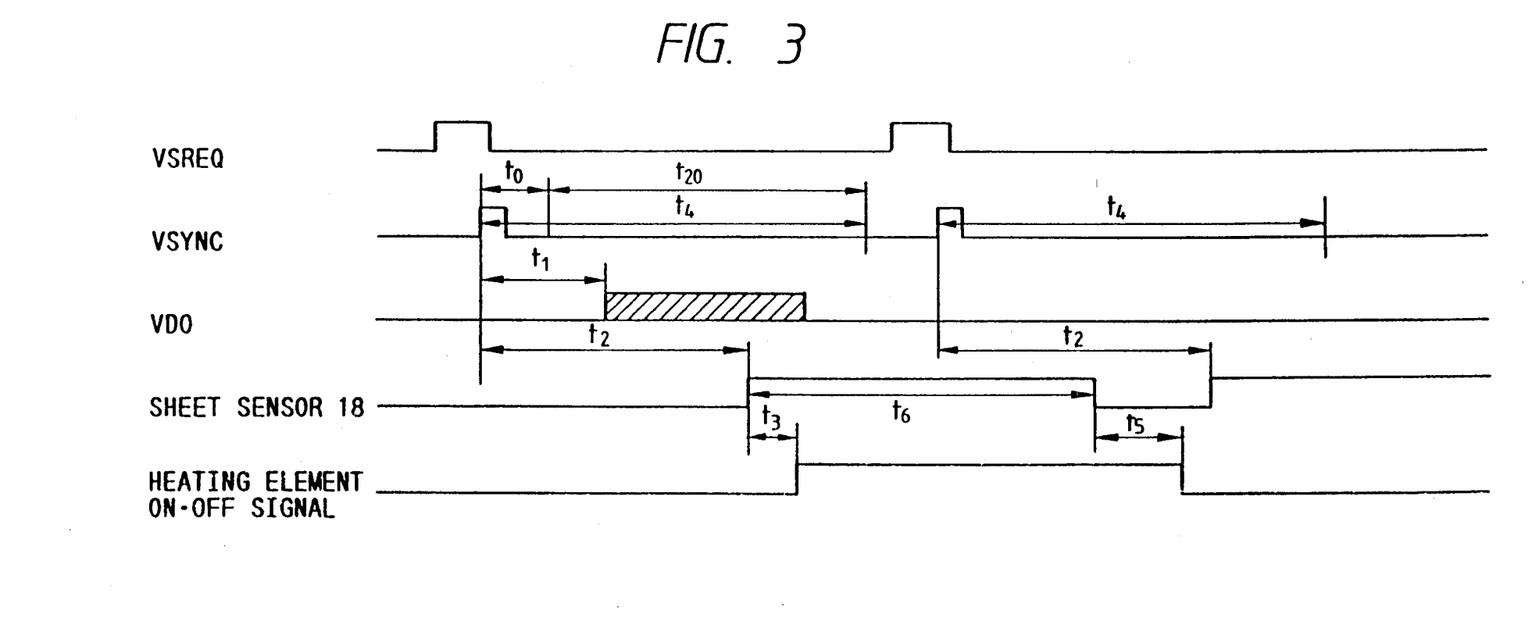
FIG. 3 is a timing chart illustrating the first embodiment of this invention.

FIG. 3 is a timing chart illustrating the turn on/off control of electric power to the heating element 10 in accordance with VDO signal supplied to CPU 102. When CPU sends VSREQ signal to the controller 101 and the latter returns VSYNC signal back to CPU 102, the registration roller 3 starts rotating at the same timing to transport a transfer sheet. CPU 102 monitors VDO signal during the period t20 from when a predetermined time t0 lapsed after the reception of VSYNC signal to when a predetermined time t4 lapses. The time t0 corresponds to the time when an image is written after the reception of VSYNC signal, and the time t4 is determined from the size of a transfer sheet. If VDO signal is inputted at a time t1 after the reception of VSYNC signal, CPU 102 memorizes this VDO signal input. If the paper sensor 18 in front of the fixing unit then detects the front end of the transfer sheet at a time t2 after the reception of VSYNC signal, CPU 102 outputs a heating element ON signal to the conduction control circuit 108 at time t3, while taking the memorized content into consideration. The time t3 is determined in accordance with the time t1 from the reception of VSYNC signal to the reception of VDO signal, while also taking into consideration the temperature rise time of the heating element 10, wherein t1 is larger than t3. The heating element 10 can thus be supplied with electric power before the time t3 elapses.

If no VDO signal is inputted during the time period t20, it is judged that a transfer sheet should be fed as a blank sheet. In this case, no toner is needed nor fixed on a transfer sheet. Electric power is therefore not supplied to the heating element 10 even if the paper sensor 18 detects the front end of the transfer sheet. The timing when electric power to the heating element 10 is turned off, is at a predetermined time t5 after the paper sensor 18 detects the back end of a transfer sheet. The time t5 corresponds to the timing when the back end of a transfer sheet travels past the midway between the pressure roller 16 and the heating surface 12 of the heating element 10.

Figure 4:
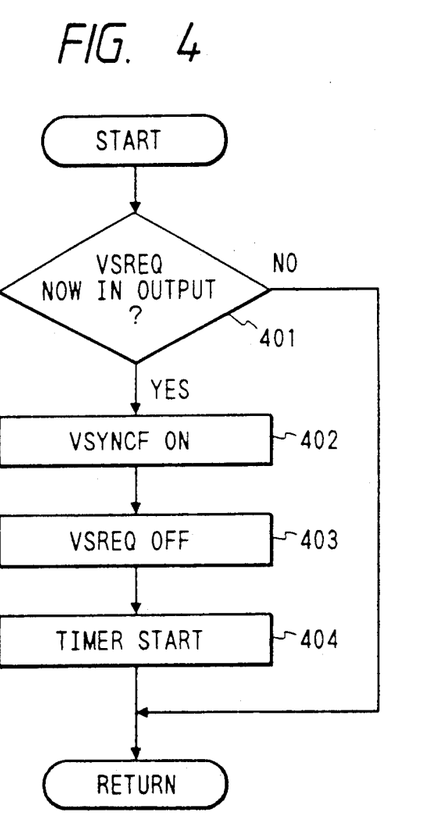
FIGS. 4 to 6 are flow charts showing the control by the first embodiment.
Figure 5:
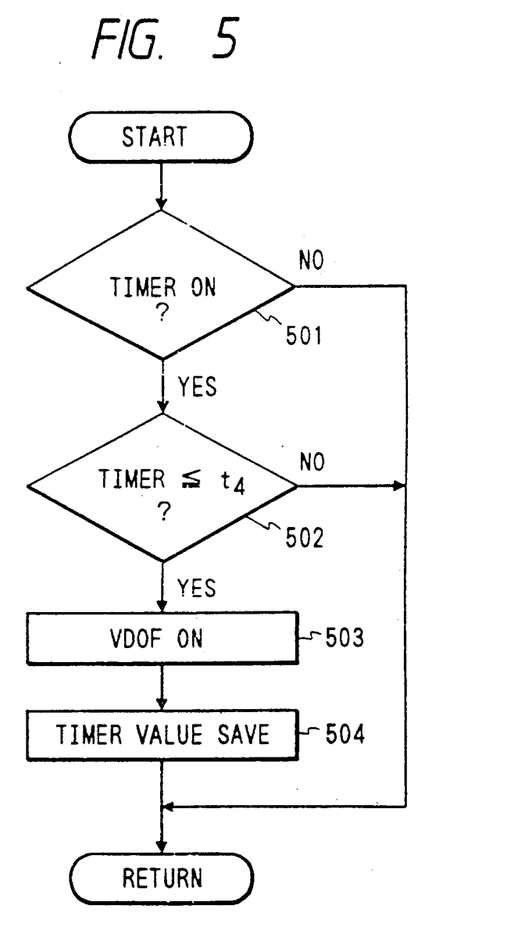
Figure 6:
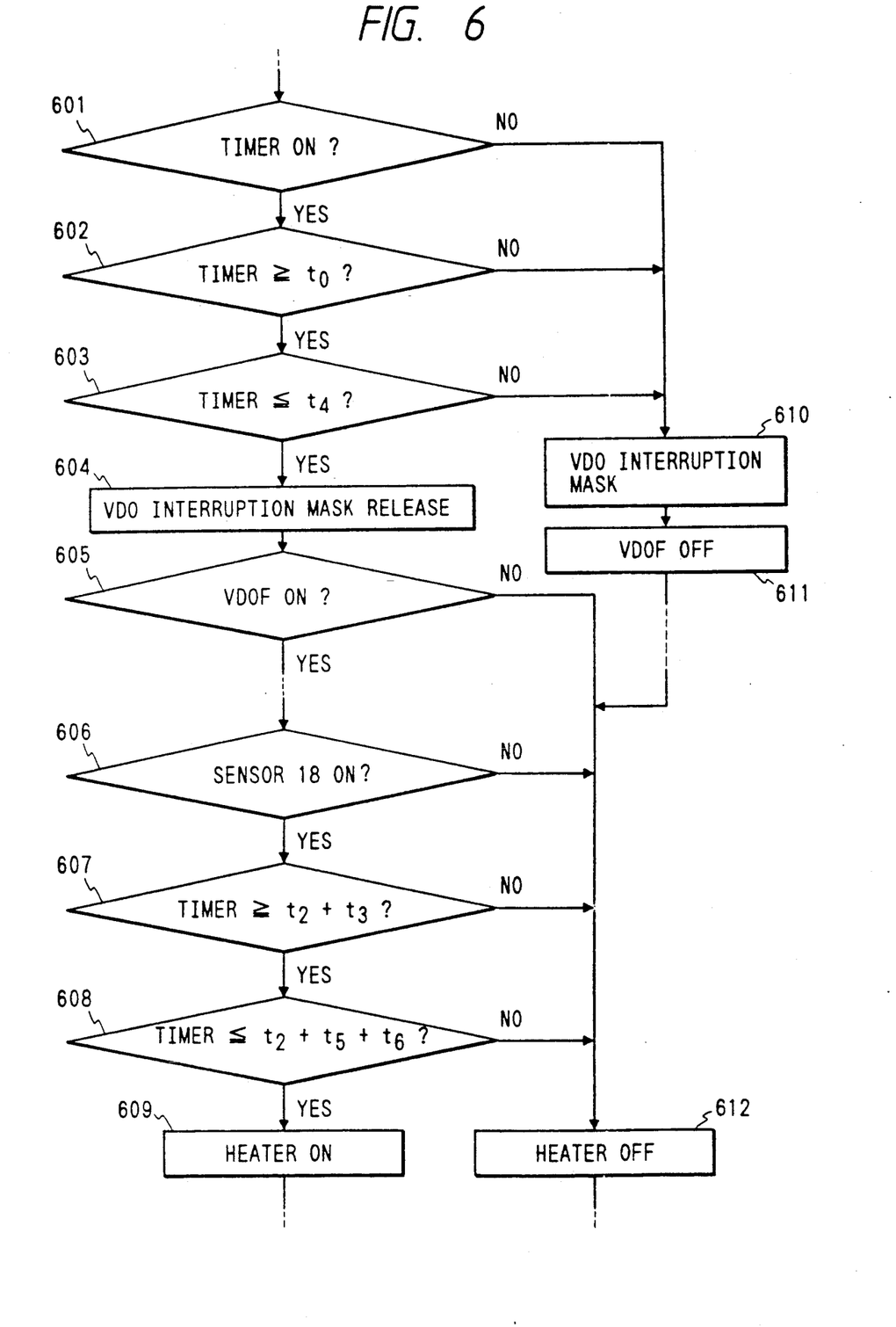

FIGS. 4 to 6 are flow charts illustrating the outline of the above-described control. The flow chart of FIG. 4 illustrates the procedure upon an external interruption by VSYNC signal at CPU 102. It is first judged at step 401 if VSREQ signal is being outputted. If no, the flow returns without conducting any operation. If yes, a VSYNC signal reception flag VSYNCF is turned on at step 402. At step 403, VSREQ signal is turned off. Started at step 404 is a timer used with the print sequence (hereinafter simply called a print timer). Thereafter the flow returns.

The flow chart of FIG. 5 illustrates the procedure upon an external interruption by VDO signal at CPU 102. It is first checked at step 501 if the print timer has started. If no, the flow returns without conducting any operation. If yes, it is checked at step 502 if the print timer has counted up the time t20 shown in FIG. 3. If yes, the flow returns without conducting any further operation. If no, turned on at step 503 is a flag indicating a reception of VDO signal (hereinafter simply called VDO flag). Stored at step 504 is the time indicated by the printer timer when VDO signal is received. The flow thereafter returns.

The flow chart of FIG. 6 illustrates the control procedure of turning on and off the heating element 10 during the print sequence. This procedure is repeated so long as the print operation continues. It is checked at step 601 if the print timer has started. If yes, it is confirmed at steps 602 and 603 that the print timer value is within $t0 \leq t \leq t4$. Within this time duration, a VDO signal interruption mask is released at step 604. At step 605 it is checked if the VDO flag is turned on. If yes, turning on of the paper sensor 18 is waited at step 606. Thereafter, it is confirmed at steps 607 and 608 that the print timer value is within $t2+t3 \leq t \leq t2+t6+t5$. At step 609 the heating element 10 is powered at that timing of t3. If the conditions at steps 601 to 603 are not satisfied, the VDO signal interruption is masked at step 610, and at step 611 the VDO flag is turned off. If the conditions at steps 606 to 608 are not satisfied also, electric power to the heating element 10 is turned off at step 612. With the procedure described above, it is possible to control the electric power conduction to the heating element 10 through the judgement, basing upon the presence/absence of VDO signal, whether or not a toner image is to be transferred onto a transfer sheet, i.e., whether or not a toner image is present on a transfer sheet.

Figure 7:
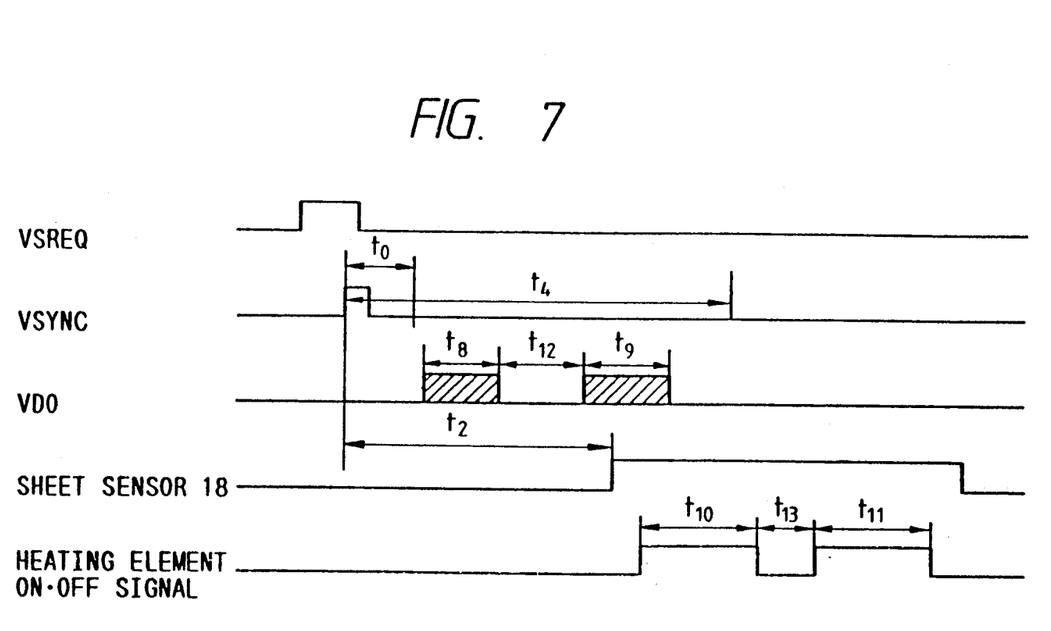
FIG. 7 is a timing chart illustrating the second embodiment of this invention.
Figure 8:
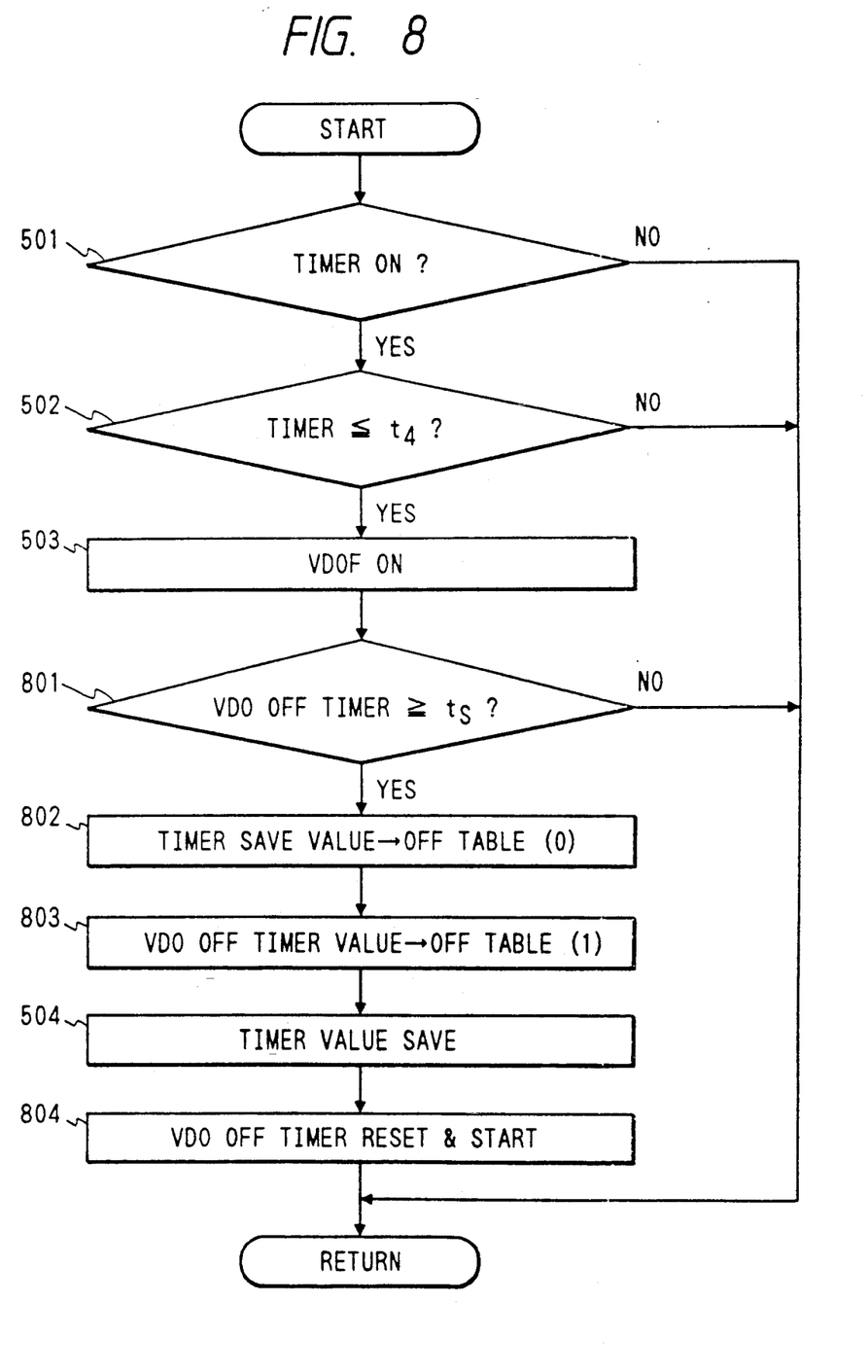
FIGS. 8 and 9 are flow charts showing the control by the second embodiment.
Figure 9:
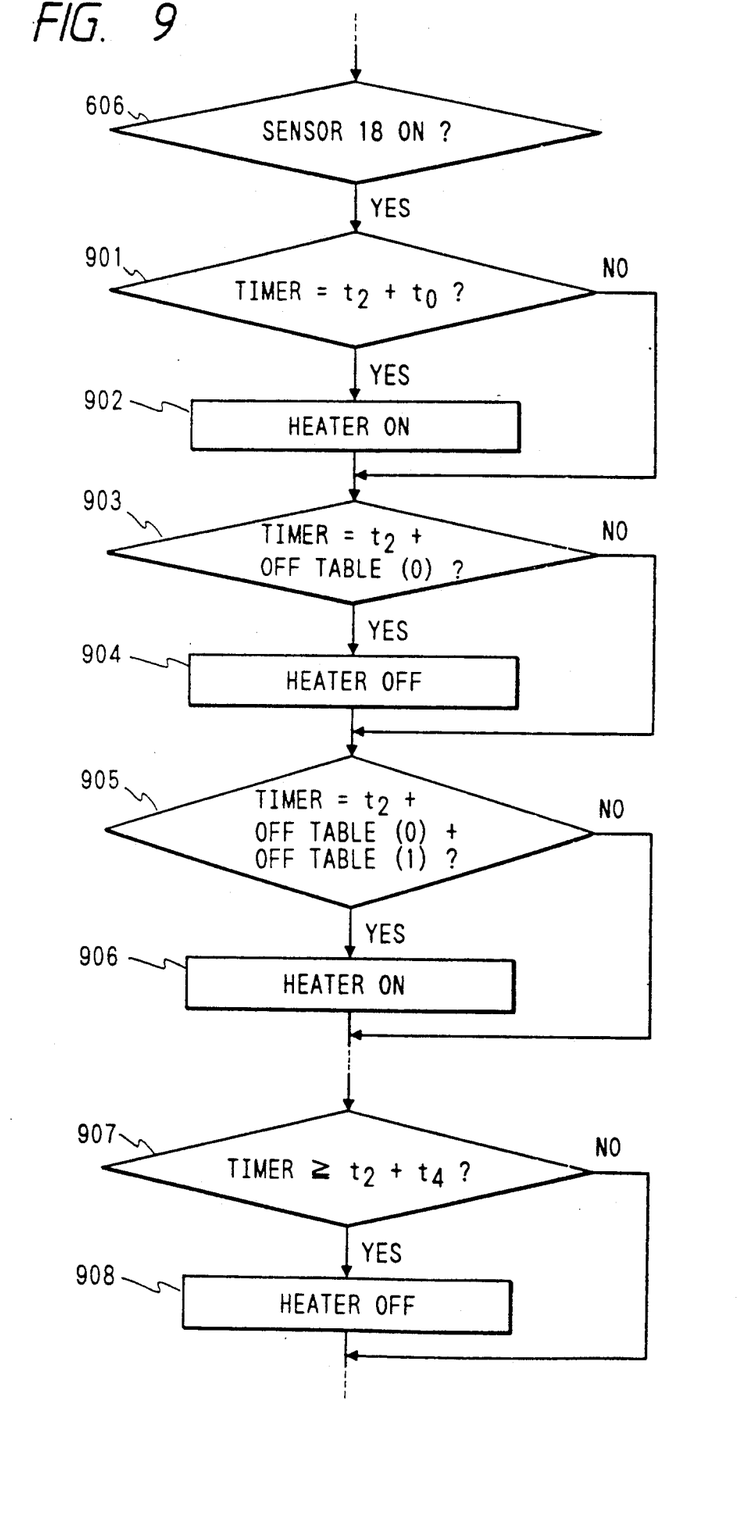

The second embodiment of the present invention is shown in FIGS. 7 to 9, FIG. 7 being a timing chart for turning on and off the heating element 10.

In the first embodiment, if VDO signal is once received during the period from time t0 to time t4 after the reception of VSYNC signal, the heating element is powered at the predetermined timing. Consequently, even if only a one line is to be printed on a transfer sheet, the heating element 9 is powered for the duration corresponding to that required for the fixing of the whole area of a transfer sheet.

A solution for this is established in the second embodiment shown in FIG. 7. Specifically, VDO signal is monitored more finely or divisionally such that if it is not inputted for a period equal to or longer than a predetermined time ts (ts≦t12), then the heating element 10 is not powered for the same period. The relationships among VDO signal input periods t8 and t9, VDO signal non-input period t12, heating element ON periods t10 and t11 and heating element OFF period t13 are defined by t8<t10, t9<t11, and t12>t13. Such a control allows a more efficient power control for the heating element. FIGS. 8 and 9 are the control flow charts according to the second embodiment. The flow chart of FIG. 8 illustrates the procedure upon interruption by VDO signal, and that of FIG. 9 illustrates the sequence control modified from FIG. 6. The procedure upon interruption by VSYNC signal at CPU 102 is the same as shown in FIG. 4. In the flow chart of FIG. 8, steps 501 to 503 are the same as of FIG. 5. It is checked at step 801 if a VDO off-time timer value exceeds a predetermined time ts (which is sufficiently longer than the temperature time constant of the heating element), the timer having started at the same time when VDO signal was received. If in excess, the timer values representative of a VDO signal input values are stored in a VDO signal off-time table at address 0 at step 902. At step 803 the timer values representative of a VDO signal off-time are stored in the table at address 1. Each time VDO signal is again entered after the off-time exceeded the time ts, the offset address of the VDO signal off-time table on the memory of CPU 102 is renewed for storage of new timer values. At step 804, the off-time timer is reset and restarted.

The flow chart of FIG. 9 illustrates the procedure of turning on and off electric power to the heating element 10. In the flow chart, checked are a timing of a detection of the front end of a transfer sheet at the fixing unit at step 901, an off-timing of a first VDO signal, and an end timing of a first VDO off-time. Checked at step 907 is a timing when the back end of the transfer sheet travels past the fixing unit. At steps 902 and 906 the conduction of electric power to the heating element 10 starts. At steps 904 and 908 the conduction of electric power to the heating element 10 is stopped. If a plurality of VDO signal off-times are stored in the table during the procedure shown in FIG. 8, the judgments and processes at steps 903 to 906 are repeated between steps 906 and 907.

As stated above, electric power to the heating element of the fixing unit can be controlled in accordance with the information which is obtained by judging; based on an input status of VDO signals, how a toner image has been transferred on a transfer sheet. Therefore, wasteful electric power will not be consumed, particularly for the case a blank transfer sheet is outputted or a transfer sheet having a large blank portion is outputted.

The judgement of a presence/absence of a toner image may be carried out not only by detecting a presence/absence of VDO signals but also by detecting with a photosensor or the like an actual presence/absence of a toner image on a transfer sheet when it reaches in the front of the fixing unit.

Further, a presence/absence of a toner image may be judged based on the state of VDO signals stored in a memory.

In the above embodiments, although a fixed length film has been used with the fixing unit, an endless film may also be used.

Figure 10:
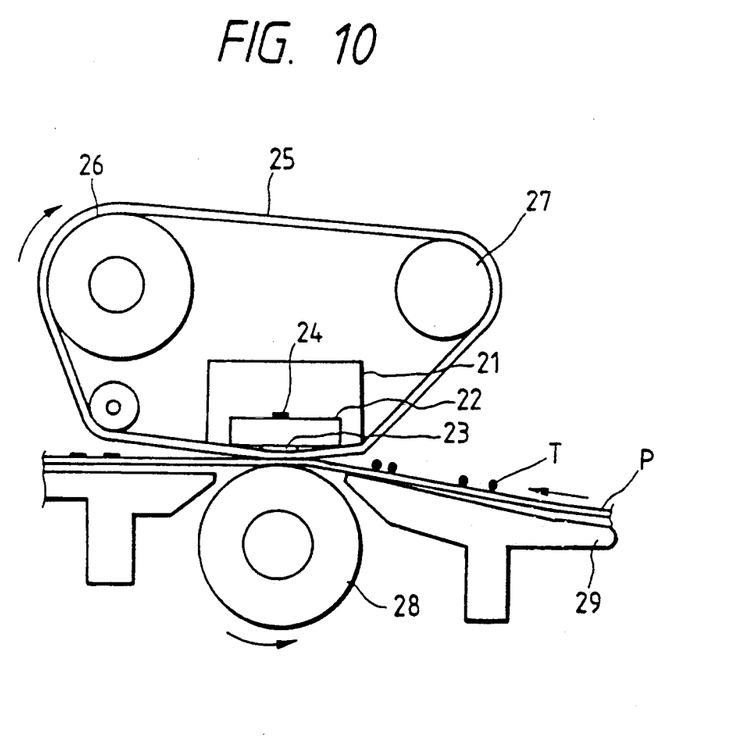
FIG. 10 is a schematic diagram showing the structure of the fixing unit according to another embodiment of this invention.

An enlarged view of the fixing unit of this embodiment is shown in FIG. 10. Reference number 21 designates a heating element of a wire shape having a low heat capacity. The heating element is made of, e.g., a resistive material 23 of 1.0 mm width coated on an aluminum substrate 22 of 1.0 mm thickness, 10 mm width and 240 mm length, electric power being supplied in the lateral direction thereof. Electric power used herein has a pulsate waveform having a 100 V DC and 20 msec period, the pulse width being changed with a desired temperature energy radiation amount under control of a temperature detecting element 24. The pulse width takes a range of approximately from 0.5 msec to 5 msec. The heating element 21 thus temperature-energy controlled becomes in contact with a fixing film 25 while the later moves in the direction designated by an arrow in FIG. 10. An example of the fixing film 25 is an endless film coated with a separation layer of 10 microns in thickness at least on the image contact side of a heat-resistive layer of 20 microns in thickness. The heat-resistive layer is made of, e.g., polyimide, polyetherimide, PES, or PFA. The separation layer is made of fluorocarbon resin such as PTFE, PAF or the like with conductive material admixed therewith. The endless film generally takes a total thickness of 100 microns, and more preferably smaller than 40 microns. The film is driven by a drive roller 26 and a slave roller 27 in the direction represented by the arrow without any deflection of the film while giving a proper tension. A pressure roller 28 has a rubber elastic layer having a good separation performance such as a silicon rubber. The pressure roller rotates to transport the film while pressing it against the heating element at the total pressure of 4 to 7 kg. A sheet P with unfixed toner T is transported via an inlet guide 20 to the fixing unit whereat the toner is heated to obtain a fixed image.

In the embodiments, the recording apparatus has been described wherein a recording sheet is heated with a heating element via a heat-resistive film. The invention is not limited thereto, but is applicable to other apparatus which perform instant image fixation.

As appreciated from the above description, driving the fixing unit can be controlled in accordance with a presence/absence of an image on a recording sheet. Therefore, wasteful electric power will not be consumed for the case where a blank sheet is outputted or a sheet with a large blank portion is outputted.

Further, a heating element of a low heat capacity can be used during the heating/fixing process where a recording sheet is heated with the heating element via a heat-resistive sheet to obtain a visible image. Furthermore, the temperature rise of the apparatus can be avoided.

I claim:

1. A recording apparatus comprising:
   (a) input means for inputting an image signal;
   (b) a light source for emitting a light to be scanned over a photosensitive member to from a latent image;
   (c) driving means for driving said light source in response to the image signal;
   (d) developing means for developing the latent image formed on the photosensitive member into a visible image by using a visualizing substance;
   (e) transfer means for transferring the visible image on the photosensitive member onto a recording medium;
   (f) fixing means for heat-fixing said visible image on said recording medium with a heating element which is heated upon conduction of electric power;
   (g) control means for controlling the conduction of electric power to said heating element; and
   (h) means for supplying the image signal to both said driving means and said control means;
   wherein said control means controls the conduction of electric power to said heating element in accordance with the image signal from said supplying means.

2. A recording apparatus according to claim 1, further comprising detection means for detecting said recording medium at a transport path of said recording medium and upstream of said fixing means, wherein said control means starts to control the conduction of electric power to said heating element in response to a detection output of said recording medium by said detection means.

3. An apparatus according to claim 1, wherein said control means comprises determining means for determining an area where said visible image is present in accordance with said inputted image signal, and storage means for storing data regarding said area determined by said determining means that said visible image is present in said area, and, wherein said control means controls the conduction of electric power to said heating element in accordance with said data stored in said storage means.

4. A recording apparatus according to claim 3, wherein said control means controls to turn on and off the conduction of electric power to said heating element in accordance with said data.

5. A recording apparatus according to claim 4, further comprising detection means for detecting said recording medium at a transport path of said recording medium and upstream of said fixing means, wherein the conduction of electric power to said heating element is turned on in response to a detection output of said recording medium by said detection means and said data.

6. A recording apparatus according to any one of claims 1, 2, 3, 4 and 5, wherein said fixing means includes pressure means for maintaining said recording medium in pressure contact with said heating element with a heat-resistive sheet interposed therebetween.

7. A recording apparatus comprising:
   (a) image forming means for forming a visible image on a recording medium using a visualizing substance;
   (b) fixing means for fixing said visible image on said recording medium with a heating element which is heated upon conduction of electric power, wherein said fixing means includes pressure means for maintaining said recording medium in pressure contact with said heating element with a heat resistive sheet interposed therebetween;
   (c) image detection means for detecting the visualizing substance on said recording medium fed from said image forming means and upstream of said fixing means; and
   (d) control means for controlling the conduction of electric power to said heating element in accordance with a detection result by said image detection means.

8. A recording apparatus according to claim 7, wherein said control means
   (a) carries out the conduction of electric power to said heating element if said image detection means detects the visualizing substance, and
   (b) does not carry out the conduction of electric power to said heating element if said image detection means does not detect the visualizing substance.

9. A recording apparatus according to claim 8, further comprising recording medium detection means for detecting said recording medium at a transport path of said recording medium and upstream of said fixing means, wherein said control means starts to control the conduction of electric power to said heating element in response to a detection output of said recording medium by said recording medium detection means.

10. A recording apparatus comprising:
    (a) image forming means for forming a visible image on a recording medium in accordance with inputted image data, said image forming means using a visualizing substance for forming the visible image;
    (b) fixing means for fixing said visible image on said recording medium with a heating element which is heated upon conduction of electric power; and
    (c) control means for controlling the conduction of electric power to said heating element in accordance with the contents of said inputted image data,
    wherein said fixing means includes pressure means for maintaining said recording medium in pressure contact with said heating element with a heat-resistive sheet interposed therebetween.

11. A recording apparatus according to claim 10, wherein said control means inhibits the conduction of electric power to said heating element when said control means determines that said recording medium has no visualizing substance on an imageable surface thereof.

12. A recording apparatus comprising:
    (a) image forming means for forming a visible image on a recording medium by using a visualizing substance;
    (b) feeding means for feeding the recording medium to said image forming means;
    (c) fixing means for fixing said visible image on said recording medium with a heating element which is heated upon conduction of electric power; and
    (d) control means for controlling the conduction of electric power to said heating element,
    wherein said control means inhibits the conduction of electric power to said heating element for the recording medium when said image forming means applies no visualizing substance on an imageable surface of said recording medium, and
    wherein said fixing means includes pressure means for maintaining said recording medium in pressure contact with said heating element with a heat-resistive sheet interposed therebetween.

13. A recording apparatus of claim 12, wherein said control means stops the conduction of electric power to said heating element if an image signal is not inputted for a predetermined time.

14. A recording apparatus according to claim 12, further comprising:
   detection means for detecting said recording medium at a transport path of said recording medium and upstream of said fixing means,
   wherein said control means starts to control the conduction of electric power to said heating element in response to a detection output of said recording medium by said detection means.

15. A recording apparatus comprising:
   input means for inputting data in synchronism with a vertical sync signal;
   feed means for feeding a recording medium;
   image forming means for forming an image on said recording medium in accordance with the inputted data;
   fixing means for heat-fixing the image formed on said recording medium with a heating element which is heated upon conduction of electric power; and
   control means for controlling said fixing means in accordance with the inputted data,
   wherein said control means starts the conduction of the electric power to the heating element in response to the inputted data, and
   wherein said control means inhibits the conduction of the electric power to the heating element when no visualizing substance is applied on said recording medium by said image forming means, even if said recording medium is fed by said feeding means.

16. A recording apparatus according to claim 15, wherein said fixing means includes pressure means for maintaining said recording medium in pressure contact with said heating element with a heat-resistive sheet interposed therebetween.

17. A recording apparatus according to claim 16, wherein a thickness of the heat-resistive sheet is 100 $\mu$m or less.

18. A recording apparatus according to claim 15, wherein said image forming means forms an image by using an electrostatic recording method.

19. A recording apparatus according to claim 18, wherein said image forming means includes a laser beam generating means.

* * * * *

UNITED STATES PATENT AND TRADEMARK OFFICE
CERTIFICATE OF CORRECTION

PATENT NO. : 5,303,015
DATED : April 12, 1994
INVENTOR(S) : KAORU SATO

It is certified that error appears in the above-indentified patent and that said Letters Patent is hereby corrected as shown below:

On the title page, Item [56]:
   line USPD, insert
       --3,936,658  02/1976  Traister et al...219/216
         3,989,370  11/1976  Mooney..........355/313
         4,627,714  12/1986  Nozaki..........219/216
         4,006,985  02/1977  Hutner..........219/216
         3,851,144  11/1974  Hutner..........219/216
         4,814,819  03/1989  Torino et al....355/270
         4,373,801  02/1983  Itoh............219/216--.

Column [56] RC,
   line FPD, insert
       --0038775  02/1989  Japan......355/285
         0215676  12/1983  Japan......355/289
         2921450  11/1979  W. Germany....355/285--.

Column [56] RC,
   line FPD, "0076041 6/1978 Japan" should read --0076041 7/1978 Japan--.

Signed and Sealed this

Tenth Day of January, 1995

Attest:

BRUCE LEHMAN

*Attesting Officer*        *Commissioner of Patents and Trademarks*